US011845008B2

(12) United States Patent
Li et al.

(10) Patent No.: US 11,845,008 B2
(45) Date of Patent: Dec. 19, 2023

(54) BUILDING VIRTUAL REALITY (VR) GAMING ENVIRONMENTS USING REAL-WORLD VIRTUAL REALITY MAPS

(71) Applicant: Sony Interactive Entertainment LLC, San Mateo, CA (US)

(72) Inventors: Miao Li, Carlsbad, CA (US); Shawn He, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/327,655

(22) Filed: May 21, 2021

(65) Prior Publication Data

US 2021/0275923 A1    Sep. 9, 2021

Related U.S. Application Data

(63) Continuation of application No. 15/911,780, filed on Mar. 5, 2018, now Pat. No. 11,014,001.

(51) Int. Cl.
*A63F 13/65* (2014.01)
*A63F 13/352* (2014.01)
(Continued)

(52) U.S. Cl.
CPC ............ *A63F 13/65* (2014.09); *A63F 13/352* (2014.09); *G06T 17/00* (2013.01); *G06T 19/00* (2013.01);
(Continued)

(58) Field of Classification Search
CPC .... A63F 13/65; A63F 13/352; A63F 2300/69; A63F 2300/8082; G06T 17/00; G06T 19/00; G06T 19/006
See application file for complete search history.

(56) References Cited

U.S. PATENT DOCUMENTS 6,768,486 B1 *  7/2004  Szabo ................... G06T 19/20
                                                    345/643
7,583,275 B2 *  9/2009  Neumann ............... G06T 17/00
                                                    703/2
(Continued)

FOREIGN PATENT DOCUMENTS

CN      107596683 A     1/2018
KR    20030056302 A     7/2003

OTHER PUBLICATIONS

CN Office Action, CN Application No. 201910140903.2, dated May 7, 2022, 10 pages.
(Continued)

*Primary Examiner* — David L Lewis
*Assistant Examiner* — Matthew D Hoel
(74) *Attorney, Agent, or Firm* — PENILLA IP, APC

(57) ABSTRACT

A method for building a gaming environment. The method includes accessing a base VR model of a real-world environment from a third party mapping data store, wherein the real-world environment includes a plurality of real-world objects. The method includes augmenting a first object in the base VR model that corresponds to a first real-world object in the real-world environment. The method includes stitching in the first object that is augmented into the base VR model to generate an augmented base VR model. The method includes storing the augmented base VR model to a library data store comprising a plurality of augmented base VR models for use as virtual environments of corresponding gaming applications storing the augmented base VR model to a library data store comprising a plurality of augmented base VR models. The method includes using one or more of the plurality of augmented base VR models to define a virtual environment of a gaming application.

19 Claims, 10 Drawing Sheets

(51) Int. Cl.
*G06T 19/00* (2011.01)
*G06T 17/00* (2006.01)

(52) U.S. Cl.
CPC ........ *G06T 19/006* (2013.01); *A63F 2300/69* (2013.01); *A63F 2300/8082* (2013.01)

(56) References Cited

U.S. PATENT DOCUMENTS

| | | | | |
|---|---|---|---|---|
| 8,128,469 | B2* | 3/2012 | Hormigo Cebolla | A63F 13/352 235/382 |
| 9,576,330 | B2* | 2/2017 | Cebolla | A63F 13/352 |
| 9,639,989 | B2 | 5/2017 | Ohashi | |
| 9,754,419 | B2* | 9/2017 | Petrovskaya | G02B 27/01 |
| 9,968,853 | B2* | 5/2018 | Hormigo Cebolla | A63F 13/352 |
| 9,978,013 | B2* | 5/2018 | Kaufhold | G06N 3/045 |
| 10,154,216 | B2* | 12/2018 | Hiasa | H04N 23/70 |
| 10,272,340 | B2* | 4/2019 | Hormigo Cebolla | A63F 13/352 |
| 10,338,600 | B2* | 7/2019 | Yoon | G06V 20/56 |
| 10,373,323 | B1* | 8/2019 | Kim | G05D 1/0276 |
| 10,419,728 | B2* | 9/2019 | Usie | G06F 21/554 |
| 10,888,777 | B2* | 1/2021 | Baughman | G06N 3/045 |
| 11,014,001 | B2* | 5/2021 | Li | A63F 13/352 |
| 11,167,214 | B1* | 11/2021 | White | G06N 3/006 |
| 11,305,195 | B2* | 4/2022 | Daniali | A63F 13/65 |
| 11,452,940 | B2* | 9/2022 | Baughman | A63F 13/215 |
| 2010/0331065 | A1* | 12/2010 | Hormigo Cebolla | H04N 21/4788 463/30 |
| 2013/0029735 | A1* | 1/2013 | Hormigo Cebolla | A63F 13/213 463/4 |
| 2013/0117377 | A1* | 5/2013 | Miller | G06F 3/013 709/205 |
| 2015/0169225 | A1* | 6/2015 | Curley | H04L 67/1095 711/162 |
| 2016/0019458 | A1* | 1/2016 | Kaufhold | G01S 13/9029 706/20 |
| 2016/0148433 | A1* | 5/2016 | Petrovskaya | G06T 19/006 345/633 |
| 2017/0182421 | A1* | 6/2017 | Hormigo Cebolla | A63F 13/352 |
| 2017/0301079 | A1* | 10/2017 | Cho | G02B 21/0052 |
| 2017/0339363 | A1* | 11/2017 | Hiasa | H04N 23/75 |
| 2017/0351712 | A1* | 12/2017 | Jung | G06F 16/29 |
| 2017/0352192 | A1* | 12/2017 | Petrovskaya | G02B 27/01 |
| 2018/0101178 | A1* | 4/2018 | Yoon | G05D 1/0253 |
| 2018/0138996 | A1* | 5/2018 | Lee | G01N 21/00 |
| 2018/0256980 | A1* | 9/2018 | Hormigo Cebolla | A63F 13/352 |
| 2018/0260688 | A1* | 9/2018 | Kaufhold | G01S 7/417 |
| 2019/0005415 | A1* | 1/2019 | Dong | G06T 7/70 |
| 2019/0080516 | A1* | 3/2019 | Petrovskaya | G06V 20/20 |
| 2019/0270015 | A1* | 9/2019 | Li | G06T 17/00 |
| 2020/0101375 | A1* | 4/2020 | Baughman | G06V 20/20 |
| 2021/0187391 | A1* | 6/2021 | Ekkati | A63F 13/65 |
| 2021/0275923 | A1* | 9/2021 | Li | A63F 13/352 |
| 2021/0346805 | A1* | 11/2021 | Daniali | A63F 13/332 |
| 2021/0379492 | A1* | 12/2021 | Baughman | A63F 13/352 |

OTHER PUBLICATIONS

CN Office Action, CN Application No. 201910140903.2, dated Oct. 26, 2022, 8 pages.
JP Office Action, JP Application No. 2020-546091, dated Dec. 7, 2021, 5 pages.
EP Office Action, EP Application No. 19 704 154.4, dated May 18, 2022, 7 pages.

* cited by examiner

BUILDING VIRTUAL REALITY (VR) GAMING ENVIRONMENTS USING REAL-WORLD VIRTUAL REALITY MAPS

CLAIM OF PRIORITY

This application is a continuation of and claims priority to and the benefit of commonly owned, patent application U.S. Ser. No. 15/911,780, filed on Mar. 5, 2018, entitled "Building Virtual Reality (VR) Gaming Environments Using Real-World Virtual Reality Maps," the disclosure of which is incorporated herein in its entirety for all purposes.

TECHNICAL FIELD

The present disclosure is software development, such as developing 3D virtual reality (VR) gaming worlds of gaming applications. Among other things, this disclosure describes methods and systems for building a VR gaming environments from available base VR models of real-world environments that is enhanced to augment missing surfaces of objects and to fill in gaps.

BACKGROUND OF THE DISCLOSURE

Video gaming has increasingly become more popular with the advancement of video game technology. For example, high powered graphics processors provide an unbelievable viewing and interactive experience when playing a video game. In addition, displays are being designed with higher and higher resolutions. For example, present technology includes displays having 2K resolution (e.g., 2.2 megapixels over 2048×1080 pixels) with an aspect ratio of approximately 19:10. Other displays having 4K UHD (Ultra high definition) resolution (e.g., 8.2 megapixels over 3840×2160 pixels) with an aspect ratio of 16:9 are now pushing into the market and is expected to gain traction. Increased graphics processing capabilities along with high resolution displays provide for a heretofore unbelievable viewing experience for the user, especially when playing a video game executed on a gaming engine designed to take advantage of the higher resolution displays.

Because of the use of high powered graphics, game developers are creating 3D immersive and interactive gaming applications. The 3D content found in these gaming applications include 3D gaming environments that are built by adding increasing number of objects within a 3D space. To be realistic, these objects may follow the normal laws of physics that define object interaction. The creation of the 3D gaming environment involves multiple steps. For example, a 3D gaming environment may be composed of one or more scenes, wherein each scene includes one or more objects. Each of the objects in a particular scene is painstakingly built by a developer and placed into the 3D gaming environment to interact with other objects. This process of building the 3D gaming environment is time-consuming, but necessary for generating an immersive environment that is enjoyable by the end user.

However, because building the 3D gaming environment is so time consuming and because the developer may be on a time constraint, full development of the 3D gaming environment may be sacrificed, such that the 3D gaming environment may be smaller than intended. In addition, a 3D gaming environment may continually be reused by the same developer in an effort to maximize its use given the cost to develop the gaming environment. However, this leads to staleness in the 3D gaming environment and ultimately to new gaming applications based on the same 3D gaming environment.

It would be beneficial to streamline the generation of a 3D gaming environment to give developers more time to building the game logic rather than the background upon which the game logic operates.

It is in this context that embodiments of the disclosure arise.

SUMMARY

Embodiments of the present disclosure relate to building VR gaming environments using real-world VR models as a base from third party mapping systems, and then augmenting surfaces of objects and filling in objects in the base VR models to create the VR gaming environments. Game developers are able to use the newly augmented and filled VR environments in gaming applications.

In one embodiment, a method for building a gaming environment is disclosed. The method includes accessing a base VR model of a real-world environment from a third party mapping data store, wherein the real-world environment includes a plurality of real-world objects. The method includes augmenting a first object in the base VR model that corresponds to a first real-world object in the real-world environment. The method includes stitching in the first object that is augmented into the base VR model to generate an augmented base VR model. The method includes storing the augmented base VR model to a library data store comprising a plurality of augmented base VR models for use as virtual environments of corresponding gaming applications. The method includes using one or more of the plurality of augmented base VR models to define a virtual environment of a gaming application.

In still another embodiment, a computer system is disclosed. The computer system includes a processor and memory, wherein the memory is coupled to the processor and having stored therein instructions that, if executed by the computer system, cause the computer system to execute a method for building a gaming environment. The method includes accessing a base VR model of a real-world environment from a third party mapping data store, wherein the real-world environment includes a plurality of real-world objects. The method includes augmenting a first object in the base VR model that corresponds to a first real-world object in the real-world environment. The method includes stitching in the first object that is augmented into the base VR model to generate an augmented base VR model. The method includes storing the augmented base VR model to a library data store comprising a plurality of augmented base VR models for use as virtual environments of corresponding gaming applications. The method includes using one or more of the plurality of augmented base VR models to define a virtual environment of a gaming application.

In another embodiment, a non-transitory computer-readable medium storing a computer program for building a gaming environment is disclosed. The computer-readable medium includes program instructions for accessing a base VR model of a real-world environment from a third party mapping data store, wherein the real-world environment includes a plurality of real-world objects. The computer-readable medium includes program instructions for augmenting a first object in the base VR model that corresponds to a first real-world object in the real-world environment. The computer-readable medium includes program instructions for stitching in the first object that is augmented into the base VR model to generate an augmented base VR model. The computer-readable medium includes program instructions for storing the augmented base VR model to a library data store comprising a plurality of augmented base VR models for use as virtual environments of corresponding gaming applications. The computer-readable medium includes program instructions for using one or more of the plurality of augmented base VR models to define a virtual environment of a gaming application.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
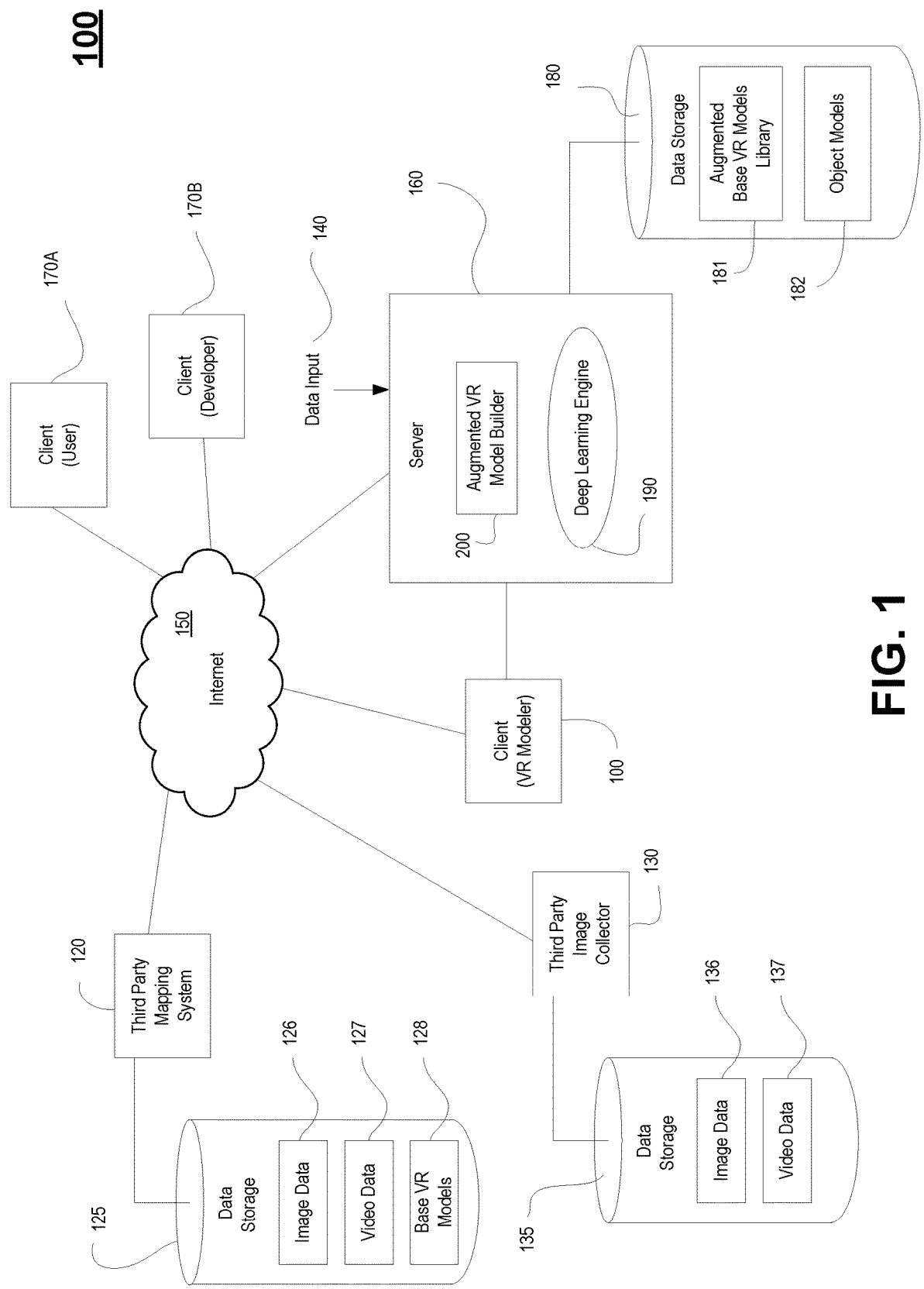
FIG. 1 illustrates a system configured for building VR gaming environments using real-world VR models as a base from third party mapping systems, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure relate to building VR gaming environments using real-world VR models as a base from third party mapping systems. Incomplete objects in the base VR models are augmented with surfaces to create a complete modeled object, and gaps within the base VR model are filled with filler objects to create one or more augmented base VR models. A mapping library contains the augmented base VR models, each of which gaming environment that is based on a real-world environment. As such, the effort used to build gaming environments is much reduced by relying on third party real-world base VR models, and modifying those base VR models to generate augmented base VR models suitable for use within gaming applications (e.g., augmented base VR model interfacing with game logic of a gaming application to implement a gaming environment). In one implementation, these gaming environments are made available to game developers during the development stage of producing gaming applications. In that manner, instead of generating a corresponding VR world or gaming environment for each new gaming application from scratch, which takes significant time and effort, game developers can immediately use the augmented base VR models as VR gaming environments for corresponding gaming applications. Further, each augmented base VR model representing a corresponding real-world environment can be used as gaming environments for multiple gaming applications. That is, once an augmented base VR model is created, that model can be used by many game developers when creating new games that are set in real-world environments. As such, instead of generating one or more unique gaming environments for each gaming application, a gaming environment can be used across multiple gaming applications. In that manner, instead of taking time to generate the VR gaming environments, game developers can focus more on the game logic that interfaces with the VR gaming environments—thereby creating better quality gaming applications. In addition, by using and reusing pregenerated gaming environments, less time is needed to develop each gaming application. Further, because one augmented base VR model can be used across multiple gaming applications, a data store configured for storing augmented base VR models operates more efficiently as it can store a reduced number of augmented base VR models, and need not store different augmented base VR models for each of a plurality of gaming applications. That is, a server system configured to execute a plurality of gaming applications, having gaming environments based on augmented base VR models, is able to efficiently store the gaming environments and quickly access the gaming environments as lesser numbers of augmented base VR models are stored.

With the above general understanding of the various embodiments, example details of the embodiments will now be described with reference to the various drawings.

Throughout the specification, the reference to "video game" or "gaming application" is meant to represent any type of interactive application that is directed through execution of input commands. For illustration purposes only, an interactive application includes applications for gaming, word processing, video processing, video game processing, etc. Further, the terms video game and gaming application are interchangeable. In addition, the reference to "digital content" is meant to represent 2D or 3D digital content to include, in part, video games, gaming applications, and videos.

FIG. 1 illustrates a system 100 configured for building VR gaming environments using real-world VR models as a base from third party mapping systems, in accordance with one embodiment of the present disclosure. The server 160 includes an augmented base VR model builder 200 and a deep learning engine 190. The server 160 is configured to build one or more VR gaming environments using real-world mappings or VR models from the third party mapping systems. In particular, the augmented base VR model builder 200 is able to access and/or receive 3D real-world data from the third party mapping systems. Each third party mapping system has their own unique way of building or mapping the real-world environment as represented by base VR models (e.g., indoor and outdoor environments). This data (raw and/or base VR models) is used to build augmented base VR models of the real-world environment, wherein the base VR models are rebuilt by augmenting incomplete surfaces of objects and filling in missing objects. The augmented base VR models provide 3D virtual views of the real-world environment from any location (e.g., not just locations associated with image capture points). In one embodiment, the real-world environment includes a live event, which is represented by the corresponding augmented base VR model. The augmented base VR models of one or more real-world environments can be stored in a library and later accessed by game developers. In that manner, the developers can save time from rebuilding those base VR models, or generating VR models from scratch, by using the pre-generated augmented base VR models. As such, developers can focus more time and energy on developing gaming logic that maximizes the gaming experience of an end user. That is, the developers are freed from building common everyday objects found repeatedly in real-world environments (e.g., buildings, trees, streets, parks, etc.) performed when building the VR gaming environment.

In particular, the deep learning engine 190 is configured to supplement the abilities of the augmented base VR model builder 200. For instance, the deep learning engine 190 may be configured to build 3D models, to include 3D surface models, of common objects that are found in one or more real-world environments. As illustrative examples, an object may include buildings, furniture, generic persons, animals, trees, bushes, foliage, vehicles, buses, etc. The deep learning engine 190 may be used for recognition of objects based on images, videos, and/or VR models of real-world environments. The 3D models 182 of objects may be stored in data storage 180. The deep learning engine 190 may also be used for recognition of a real-world environment based on images, videos, and/or VR models of the real-world environments. Further, the deep learning engine 190 is configured to recognize objects that are incomplete (e.g., incomplete surface models) from base VR models, and is configured to recognize gaps (e.g., missing objects) within base VR models representing corresponding real-world environments, wherein the gaps are identified by the deep learning engine 190. In that manner, the augmented base VR model builder 200 is able to augment incomplete surface models with additional surfaces based on previously defined object models, and also fill in gaps in the base VR models with filler objects to create augmented VR models. Management of the augmented VR model building process may be performed via a client device 100 providing an interface to the building process.

The augmented base VR models are stored in the library 181 of data storage 180. In addition, object models (e.g., surface models) 182 are also stored in data storage 180. The augmented base VR models can be later accessed and used as gaming environments that are integrated with gaming logic during development of corresponding gaming applications. In that manner, the game developers need only access a pre-generated gaming environment (e.g., 3D VR models) representing a real world environment for use in gaming applications instead of generating those gaming environment. The game developer may access the augmented VR models library 181 via a client device 170 through the internet 150. In addition, the augmented base VR models can be later accessed by a server or computing resource configured to execute one or more gaming applications in association with game plays of multiple users, wherein during game play of a user game logic of a gaming application creates a corresponding gaming environment as implemented through a corresponding augmented base VR model.

Client devices 100 (of a VR modeler), 170A (e.g., of a user playing a gaming application), and 170B (e.g., of a game developer) may be any general or special purpose computer known in the art, including but not limited to, a gaming console, personal computer, laptop, tablet computer, mobile device, cellular phone, tablet, thin client, set-top box, media streaming device, etc. In one embodiment, the client devices 100 and 170A-170B can be configured to execute a video game, and output the video and audio from the video game for rendering by an HMD (not shown). The client devices 100 and 170A-170B can also be configured as thin clients in communication over a network with the server 160. For example, the HMD may be worn when editing and/or generating an augmented VR model, in one implementation. In another implementation, the HMD may be worn by a game developer when reviewing a VR gaming environment during game development. The client devices 100 and 170A-170B are not restricted to executing a video game but may also be configured to execute an interactive application, which outputs VR content for rendering by the HMD. In general, an HMD is worn in a manner similar to glasses, goggles, or a helmet, and is configured to display a video game from an interactive video game or other content from interactive application, to the corresponding user. The HMD provides a very immersive experience to the user by virtue of its provision of display mechanisms in close proximity to the user's eyes. Thus, the HMD can provide display regions to each of the user's eyes which occupy large portions or even the entirety of the field of view of the user.

System 100 includes a third party mapping system 120 that is configured for providing base VR models. The base VR models 128 are built using image data 126 and/or video data 127, both of which are stored in data storage 125. For example, a base VR model of Paris, France around the vicinity of the Eiffel Tower may be built using captured image data 126 (e.g., from image capture devices of professionals and/or tourists, etc.) and/or captured video data 127. A general discussion on the generation of base VR models 128 is provided below in relation to FIG. 5A.

For example, the third party mapping system may provide services to users to include a 3D view of a street that acts as a base VR model. Various search companies provide these views of city streets throughout the world to the general public. Basically, the user is able to hop between capture points along a street, and at each capture point rotate the view (e.g., 360 degrees) at that specific capture point. The capture points are typically located at or near the center of a street. Views from points other than capture points are not provided by the third party mapping systems 120. On the other hand, embodiments of the present disclosure are able build upon the base VR models 128 to generate augmented base VR models that are stored in library 181 using the server 160, as will be further described below. In some embodiments, the server 160 is configured to build on the base VR models 128, and in other embodiments, the server 160 is configured to access the raw image data 126 and/or video data 127 in order to build the base VR models 128, which later can be further augmented and filled to create complete VR models of real-world environments, as will be desired further below.

In addition, system 100 includes the third party image collector 130 that is configured for providing additional image data 136 and/or video data 127, both of which are stored in data storage 135. This additional image and video data may be used for augmenting objects in the base VR models that are either incomplete or missing. For example, the base VR model of Paris, France may be incomplete as the image data 126 and the video data 127 used to create that base VR model may be captured from an insufficient number of capture points. That is, the image data 126 and the video data 127 are also insufficient to build a complete VR model of Paris, France. In that manner, additional and supplemental image data 136 and/or video data 137 may be accessed by the server 160 in order to augment incomplete surface models of objects in the base VR model. For example, incomplete surface models may be completely replaced with corresponding and generic completed surface models, or missing surfaces may be replaced with surface portions from the completed surface models (e.g., built by the deep learning engine 190).

Figure 2:
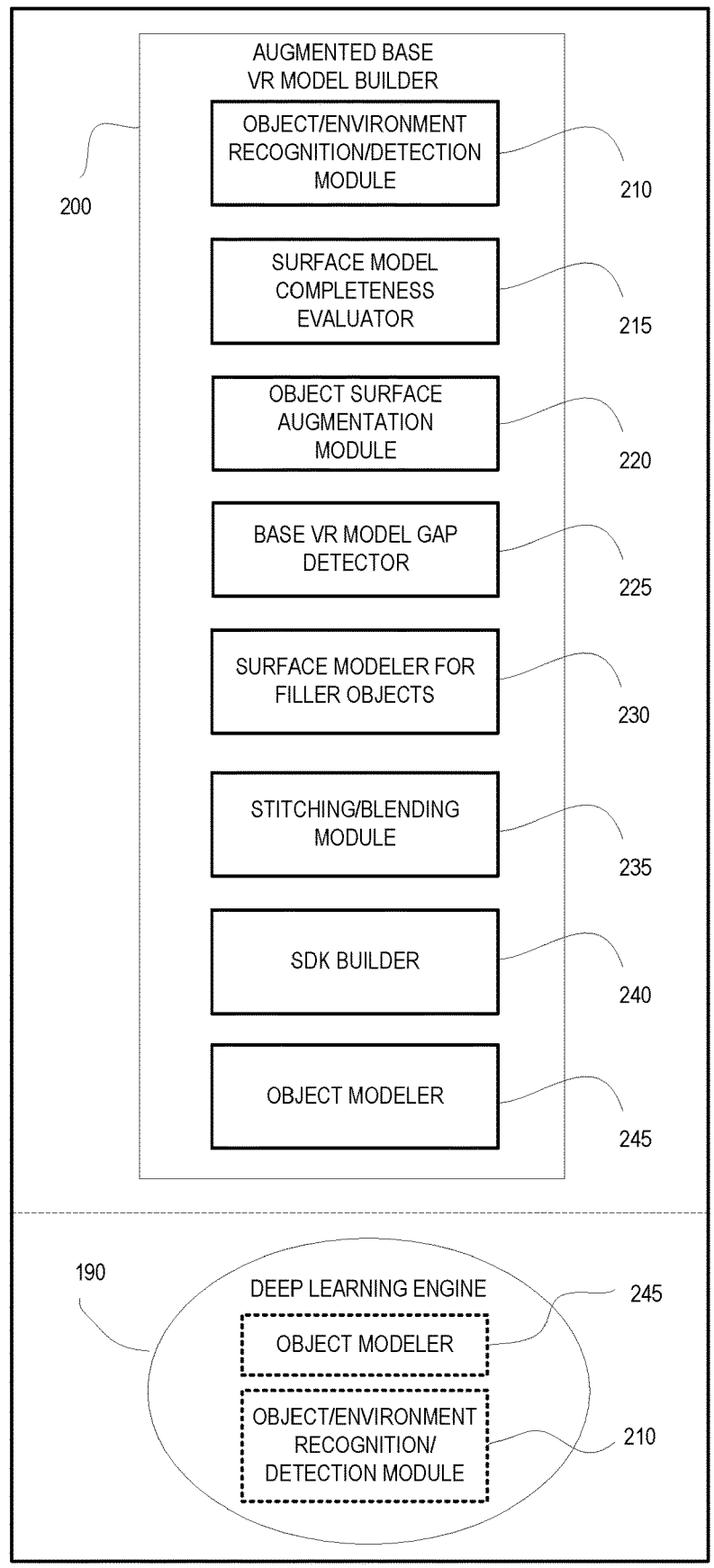
FIG. 2 illustrates functional components of a VR model builder configured for building VR gaming environments using real-world VR models as a base from third party mapping systems, in accordance with one embodiment of the present disclosure.

FIG. 2 illustrates functional components of a server 160 that are configured for building VR gaming environments using real-world VR models as a base from third party mapping systems, in accordance with one embodiment of the present disclosure. In particular, system 160 includes an augmented base VR model builder 200 configured for building augmented base VR models and a deep learning engine 190 supporting builder 200, wherein control and access to system 200 may be through client device 100 either directly with server 160 or through a network, such as internet 150. The components of the system 160 may be implemented in software, hardware, or a combination of software and hardware.

In particular, augmented base VR model builder 200 includes object/environment recognition detection module 210 that is configured for recognizing objects and/or a local environment based on images and/or video taken within the local environment. The detection module 210 is configured within deep learning engine 190, in one embodiment. In one implementation, the detection module 210 is configured for detecting one or more objects. For example, one or more images and/or a video can be input into the deep learning engine 190 for purposes of object recognition. In particular, the deep learning engine 190 is able to identify objects within an image (including an image of a video) by recognizing that patterns of objects within the image are similar to patterns of objects that have been previously learned or modeled by the deep learning engine 190. For example, the deep learning engine 190 is able to model a house cat, and even more specifically to model a breed or type of house cat (e.g., calico), by providing as input a plurality of images of cats, and having the deep learning engine 190 recognize patterns that are unique to the house cat. A cat recognition (e.g., object recognition for a cat) algorithm can be created that when performed by the deep learning engine can recognize objects within an image having the same patterns for cats. That is, the deep learning engine 190 can recognize when an image includes a cat object. In addition, other objects within the image are also recognized by the deep learning engine 190 using other corresponding object identifier algorithms.

In another implementation, the detection module 210 is configured for detecting the local environment. For example, one or more images and/or a video can be input into the deep learning engine 190 for purposes of environment recognition. That is, the deep learning engine 190 is able to identify the local environment which the image or video is capturing. An environment recognition algorithm (each algorithm specific to a local environment) can be created that when performed by the deep learning engine 190 can recognize the local environment based on captured images and/or video. As such, when the image and/or video is provided as input to the deep learning engine, the corresponding environment recognition algorithm will determine that the input is associated with its local environment.

In addition, the augmented base VR model builder 200 includes a surface model completeness evaluator 215 that is configured to determine when objects in a base VR model of a real-world environment (e.g., as provided through a third party mapping system) is incomplete. An object model (e.g., surface model) may be incomplete when not enough images are used to create the model. For example, when only one image is used to model the object, the opposing side may not be viewable, and will not be included within the object model, and as such is incomplete. When objects and/or the models of the objects are identified as being incomplete, additional actions may be performed to complete those models, as will be described below.

Augmented base VR model builder 200 includes an object surface augmentation module 220 that is configured to augment incomplete surface models with information in order to complete those surface models. For example, when a surface model of a corresponding object is identified as being incomplete, portions of the surface that are missing in the model may be accessed and/or generated to be included in the surface model, thereby making the model complete. For example, a generic surface model for that object may have been previously generated, and portions of the surface that are missing from the base VR model can be used to augment the incomplete surface model. Also, the complete generic surface model may be used as a substitute for the incomplete surface model. In addition, if no generic model exists, then the object surface augmentation module 220 is configured to access and/or grab additional images or video of the object (e.g., taken of the object within the corresponding local environment, or taken of a corresponding generic object), and based on the additional information generate portions (or a complete model) of the surface that are missing that are then used to augment the incomplete surface model or build a complete surface model that can be used in substitution.

Further, augmented base VR model builder 200 includes base VR model gap detector 225 that is configured to analyze a base VR model of a corresponding real-world environment, as provided by a third party source, and detect gaps within the model. A gap in the base VR model is exemplified by one or more missing objects within a gap region. For example, when the local environment is recognized by the deep learning engine 190 as being the Eiffel Tower in Paris, France, based on images and/or other information sources it is known that a particular restaurant is within the immediate vicinity. A gap may be identified as not having that particular restaurant in the base VR model. Other missing objects may be identified as missing from the same gap and/or other gaps of a corresponding base VR model.

The augmented base VR model builder 200 includes a surface modeler for filler objects 230 that is configured to build filler objects to be placed into gaps identified in a corresponding base VR model. For example, the filler objects may have no association with actual objects found in the same space of the corresponding real-world. That is, the filler objects may be any object that may be placed into the gap or gap region of the base VR model. For example, in a base VR model of an office, filler objects may include a credenza, picture on a wall, plant, or plant on a table, etc. These filler object may be pre-generated, or may be generated when augmenting the base VR model. In one implementation, additional images and/or video of a corresponding filler object is accessed (e.g., from a third party image collector 130 of FIG. 1), and used to generate a surface model for the filler object. In another implementation, the filler objects may be associated with actual objects found in the same space of the corresponding real-world. As such, a filler object may be representative of a corresponding real-world object, and the filler object may be used within the base VR model within the corresponding gap region.

Further, the augmented base VR model builder 200 includes stitching/blending module 235 that is configured to create the augmented VR models of corresponding real-world environments. In particular, additional images and/or videos, as well as augmented surface models of incomplete objects, replacement surface models of incomplete objects, and filler objects can be stitched together to create the augmented VR model that is formed from the base VR model provided by the third party mapping system.

The augmented base VR model builder 200 includes a software development kit (SDK) builder 240 that is configured to provide access to the generated augmented VR models of corresponding real-world environments. For example, the SDK may include tools that give access to server 200 that manages the library of augmented VR models. In particular, the SDK may give access by game developers to the library of augmented VR models 181, wherein a selected augmented VR model can be layered with game logic to develop a gaming application. The SDK may be specific to a particular gaming platform (e.g., Sony PlayStation®, in one implementation. In another case, the SDK may only provide access to the library of augmented VR models 181, from which a selected VR model may be integrated with game logic playable on one or more gaming platforms.

The augmented base VR model builder 200 includes object modeler 245 configured for building surface models for one or more generic objects. That is, some objects are found in one or more real-world environments, such as one story buildings, a family home, a two story building, a gas station, a particular animal, a generic person standing, a generic person walking, a vehicle, a motorcycle, a desk, a tree, a semi-trailer, etc. Generic surface models may be generated for those objects. For example, images and/or video for a corresponding object may be input into the object modeler 245, as implemented within the deep learning engine 190, to create a generic model for that object.

The augmented base VR model builder 200 may also work in conjunction with a deep learning engine 190 that is configured to perform repetitive and compute intensive operations. Specifically, the deep learning engine 190 may include and perform the functions of the previously introduced object modeler 245 and the object/environment recognition/detection module 210. The deep learning engine is described more fully in relation to FIG. 3.

Figure 3:
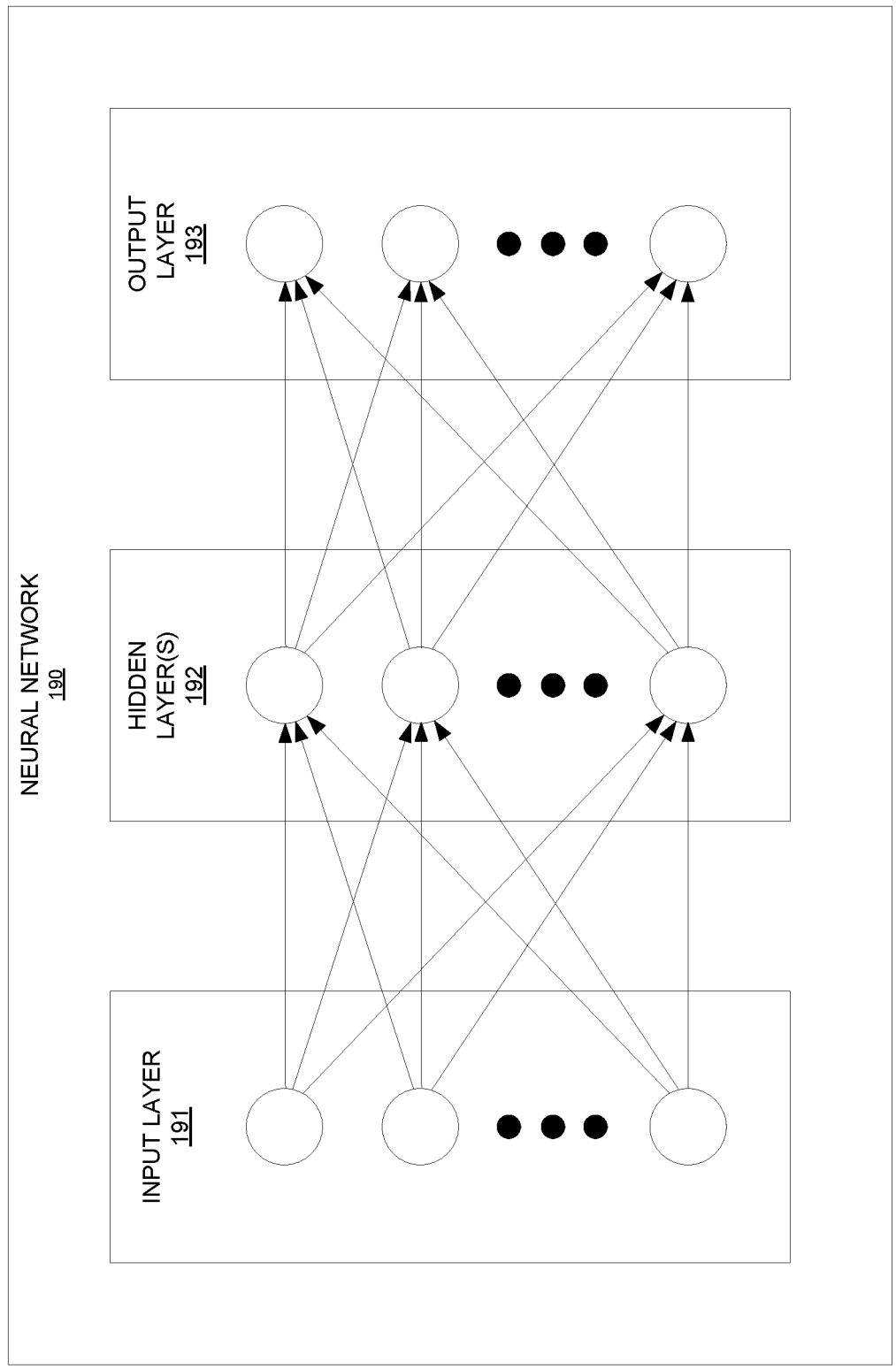
FIG. 3 illustrates an example neural network used for building models of objects, for recognition of objects within images and/or videos, and for recognition of real-world environments, in accordance with one embodiment of the present disclosure.

FIG. 3 illustrates an example neural network used to build surface models for objects, to perform recognition of objects within images and/or videos, and to perform the recognition of local environments that are captured within images and/or videos, in accordance with one embodiment of the present disclosure. Specifically, the deep learning or machine learning engine 190 in the server 160 is configured to receive as input information (e.g., images, videos, base VR models, etc.) related to objects and/or local environments. The deep learning engine 190 utilizes artificial intelligence, including deep learning algorithms, reinforcement learning, or other artificial intelligence-based algorithms to build surface models for objects, as previously described, to recognize objects within images and/or videos, and to recognize local environments within images and/or videos. That is, during learning and/or modeling phases, input data is used by the deep learning engine 190 to create surface models for objects and to create parallel models (e.g., learned algorithms) that can be used to identify/recognize particular predefined objects. For example, the input data may include multiple images of a cat, which when fed into a deep learning engine 190 is configured to create a surface model for a generic cat, and also to create an object recognition algorithm (model) that is used to identify cats within an image and/or video, and within a VR model of a real-world environment.

A neural network 190 represents an example of an automated analysis tool for analyzing data sets to determine the responses, actions, behavior, wants and/or needs of a corresponding user. Different types of neural networks 190 are possible. In an example, the neural network 190 supports deep learning. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to local data 115 collected actively through actuators or passively by sensors during monitoring and/or querying of the user and the environment associated with the user by the autonomous personal companion 100.

At the highest hierarchical level, an output layer 193 exists. The output layer 193 includes a set of output nodes. An output node represents a decision (e.g., prediction) that relates to one or more components of a local AI model 120, for example. As previously described, the output nodes may identify the predicted or expected responses, actions, behaviors, wants and/or needs of the user for a given set of inputs, wherein the input may define various scenarios (e.g., direct requests, time of day, various patterns of behavior, etc.). These results can be compared to predetermined and true results obtained from previous interactions and monitoring of the user and/or environment in order to refine and/or modify the parameters used by the deep learning engine 190 to iteratively determine the appropriate predicted or expected responses, actions, behaviors, wants and/or needs of the user for a given set of inputs. That is, the nodes in the neural network 190 learn the parameters of the AI model 120 that can be used to make such decisions when refining the parameters.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a linear rectifier function $f(x)=\max(0,x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the patterns and/or characteristics of similar objects, for recognizing a local environment, for building a surface model for a generic object, etc. based on a given set of inputs or input data. In this illustration, the data domain includes image and video data of objects or of a local environment. In another example, the training dataset is from different data domains to include input data other than baseline. As such, the neural network 190 may recognize objects within an image and/or video data, or may recognize a local environment as captured by image and/or video data, or may be configured to generate a surface model for a corresponding object based on input image and video data.

Figure 4A:
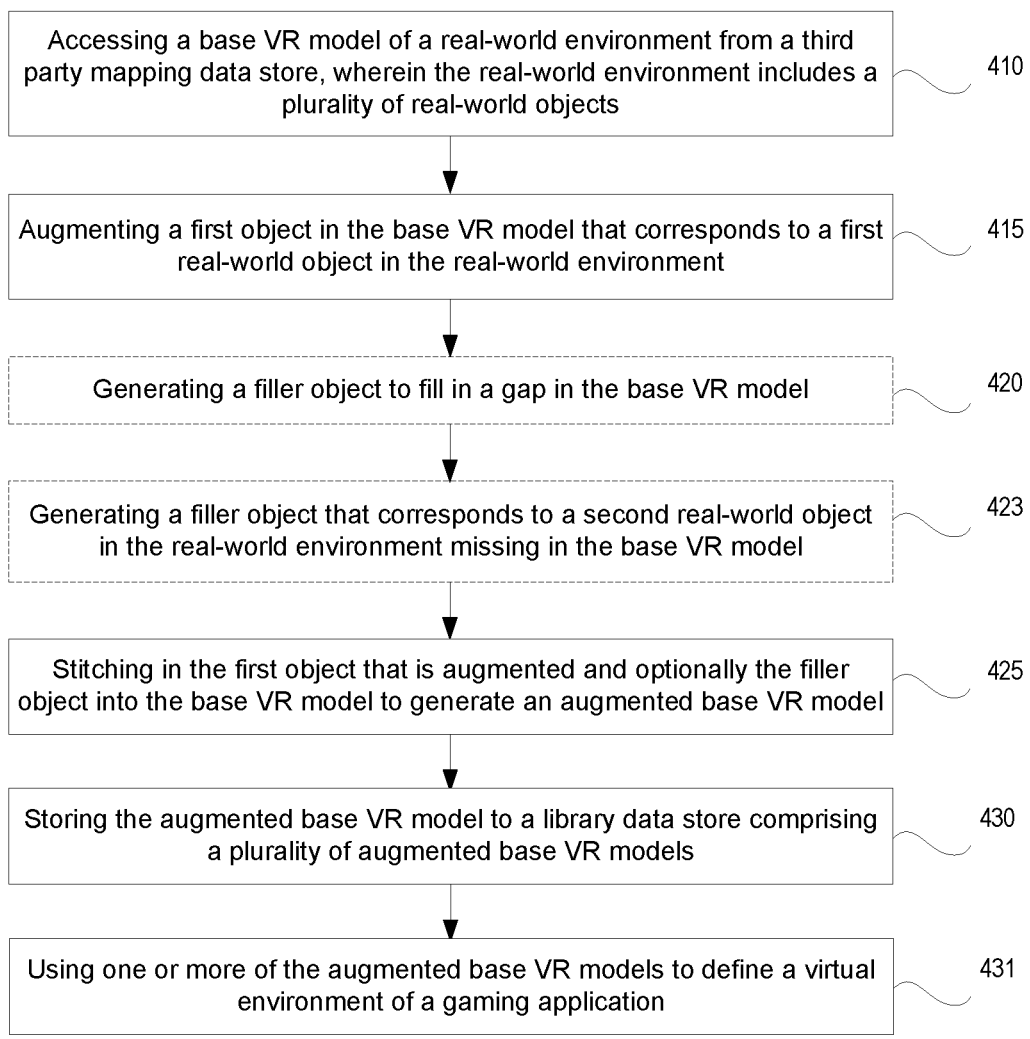
FIG. 4A is a flow diagram illustrating steps in a method for building VR gaming environments using real-world VR models as a base from third party mapping systems, in accordance with one embodiment of the present disclosure.

With the detailed description of the various modules of system 200 including the augmented base VR model builder 200 and deep learning engine 190, flow diagram 400A of FIG. 4A discloses a method for building VR gaming environments using real-world VR models as a base from third party mapping systems, in accordance with one embodiment of the present disclosure. Flow diagram 400A is implemented within system 200, and more particularly within the augmented base VR model builder 200 and/or deep learning engine 190, when building the augmented VR models of corresponding real-world environments, as previously described.

Though the method of flow diagram 400A is described within the context of building augmented VR models of real-world environments for purposes of providing gaming environments when developing gaming applications, other embodiments are well suited to building augmented base VR models of any type of environment as virtual environments. That is, augmentation of any type of base VR model may be performed to generate one or more augmented VR models, wherein the base VR model may correspond to real, imaginary, virtual, and/or other digitally created worlds.

At 410, the method includes accessing a base VR model of a real-world environment from a third party mapping data storage. The real-world environment includes a plurality of real-world objects, such that the real-world objects can be found in the environment. Embodiments of the present invention generate VR worlds corresponding to real-world environments, wherein the VR worlds can be used as gaming environments for gaming applications. Rather than beginning from scratch, or from the bottom up, VR worlds from third party mapping entities are used as base VR models. The base VR models are typically very limited in scope and generally incomplete. That is, the base VR models do not provide full coverage of the real-world environment, such that views into the real-world environment are only provided from a predefined set of points or locations within the environment. On the other hand, embodiments of the present disclosure are configured to modify the base VR models to create complete models of the real-world environment that provide full coverage (e.g., the space defined by a corresponding augmented base VR model is viewable from any location within the space). Of course, other embodiments of the present invention are also able to generate the VR worlds, such as those used as gaming environments, in their entireties (e.g., building from the bottom up).

As previously described, the plurality of real-world objects in the real-world environment may be determined through a deep learning process. That is, images and/or videos of the real-world environment are provided as input into the deep learning or machine learning engine 190 in the server 160. The deep learning engine 190 utilizes artificial intelligence, including deep learning algorithms, reinforcement learning, or other artificial intelligence-based algorithms to recognize objects within the images and/or videos, and to recognize local environments within images and/or videos.

At 415, the method includes augmenting a first object in the base VR model. The first object corresponds to a first real-world object in the real-world environment. The first object may be a representation (e.g., a surface model) of the first real-world object in the base VR model.

In one embodiment, the first object may be incomplete in the base VR model, such that the representation is incomplete (e.g., one or more surface segments missing in the surface model). The first object is augmented to generate a more complete representation of the first real-world object within the base VR model. In one embodiment, surface segments may be used to augment an incomplete surface model corresponding to the first real-world object, wherein the surface model is missing one or more surface segments. In another embodiment, a completed surface model of the first real-world object (e.g., a generic or custom surface model) may be substituted for the incomplete surface model and used to represent the first real-world object when augmenting the base VR model. The completed surface model may be pre-generated in one embodiment, and in another embodiment is generated from a plurality of images and/or videos of the first real-world object.

In other embodiments, the first object may be missing from the base VR model. That is, the augmentation process may be modified to generate a representation of the first real-world object within the base VR model. In one embodiment, a pre-generated completed surface model may be used to represent the first real-world object when augmenting the base VR model. In another embodiment, a completed surface model is generated from a plurality of images and/or videos of the first real-world object and used to represent the first real-world object when augmenting the base VR model.

The method optionally determines a gap region in the base VR model. The gap region is devoid of at least one object. In one example, the base VR model is missing data for represented regions in the real-world environment. In another example, a representation of an identified second real-world object in the real-world environment may be missing from the base VR model.

The method includes accessing a filler object to fill in the gap region. In one implementation, the filler object may be any generic object used to fill in the gap region, and may or may not be present within the real-world environment. For example, the filler object may be pre-generated and stored for access, or the filler object may be generated based on images and/or video of the corresponding object and accessed after being generated. For instance, at 420, the method includes generating a filler object, and/or accessing a pre-generated filler object, to fill in the gap region. In another implementation, the filler object may correspond to the second real-world object, previously introduced, that is missing from the base VR model. For instance, at 423, the method includes generating a filler object, and/or accessing a pre-generated filler object, that corresponds to the second real-world object in the real-world environment.

At 425, the method includes stitching in the first object that is augmented into the base VR model to generate an augmented base VR model corresponding to the real-world environment. Further, the method optionally includes stitching in the one or more filler objects into the base VR model to generate the augmented base VR model. Stitching algorithms and methods are well known in the art, and are used to integrate objects, images, videos together to create a seamless 3D model of the environment. For example, stitching includes substituting the augmented surface models for the incomplete surface models when generating the augmented VR model. In addition, the one or more filler surface models are placed into the base VR model of the real-world environment when generating the augmented VR model. As such, within the augmented base VR model, objects are viewable from any location. That is, the augmented VR model of the real-world environment is complete, such that views can be generated from any location in the real-world environment. In that manner, objects can be viewable from any perspective as taken from any location in the environment of the augmented VR model.

At 430, the method includes storing the augmented base VR model to a library data store comprising a plurality of augmented base VR models. Each of the augmented base VR models is configured for use as corresponding virtual environments of corresponding gaming applications. In one embodiment, an augmented base VR model can be used as a gaming environment of a gaming application. At 431, the method includes using one or more the plurality of augmented base VR models to define a virtual environment of a gaming application.

For example, a client device of a game developer may access the one or more augmented base VR models during game development to facilitate the interfacing of the game logic of the gaming application with the augmented base VR model. In particular, the method includes making available a corresponding augmented base VR model from the library data storage through a software development kit (SDK) to a remote device for use in developing game logic of a gaming application configured to interface with the augmented base VR model, the gaming application having a gaming environment based on the real-world environment. In that manner, the game logic is interfaced with the augmented base VR model to provide a gaming environment for the gaming application.

In another example, a client device in association with game play of a first user playing the gaming application may access the one or more augmented base VR models during execution of the game logic. In that manner, the gaming environment of the game play of the user is implemented through the one or more augmented base VR models of corresponding real world environments. In particular, the method includes receiving a request for the augmented base VR model from a remote device. The augmented base VR model is delivered to the remote device for interfacing with game logic of the gaming application, wherein the game logic is executing on the remote device in association with a game play of the first user. The remote device may be a server configured to execute a plurality of game logics for a plurality of users, in one embodiment. In another embodiment, the remote device may be a console of the first user.

In that manner, the virtual or gaming environment of a corresponding real-world environment can be generated without having to create all of the graphics from scratch, in embodiments. This is accomplished by using third party mapping data and augmenting it, such that part of the augmented virtual environment is premade, and reusable within the augmented virtual environment. The augmented virtual environment is generated by adding and/or importing other graphics data, as well as portions of other VR worlds. The augmented virtual environment can be used as the background or environment of a gaming application. That is, the augmented virtual environment becomes part of the functional game logic.

In one embodiment, the third party mapping data is analyzed and used to generate grid mapping of the objects found in the real-world environment. Layers of functionality can be applied to the grid mappings of the objects. For example, color, lighting, and texture, and other features can be layered on top of the grid mappings. In addition, the objects represented by the grid mappings can be influenced by physical laws that are programmed into the game logic. In that manner, objects look and respond realistically, especially when interacting with other objects in the virtual environment. In another embodiment, the grid mapping representation of objects can be modified to generate an animated and/or graphical version of the real-world environment for use as a virtual environment in a gaming application. In addition, skinning can be performed to generate modified skins for objects when desired.

Figure 4B:
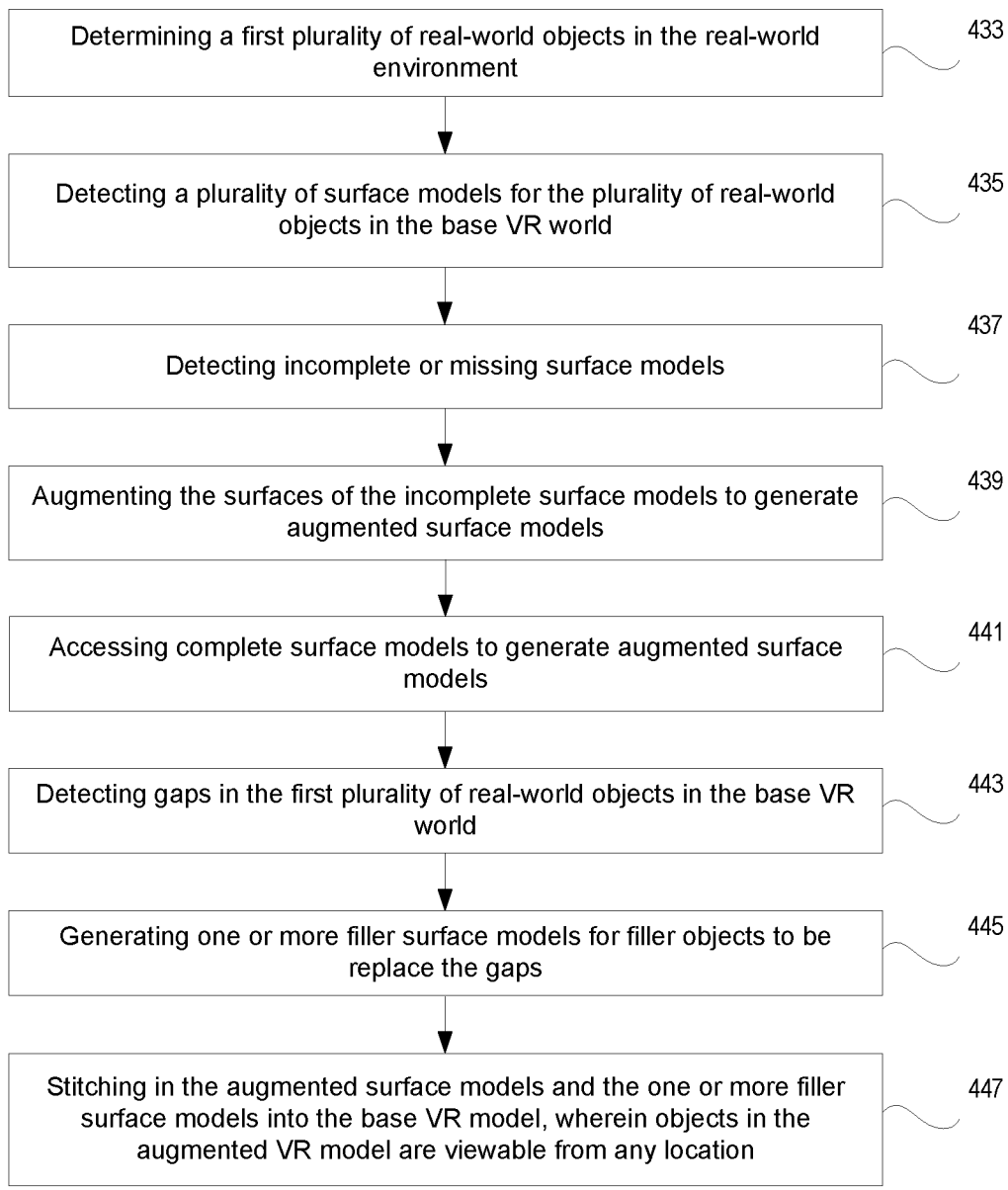
FIG. 4B is a flow diagram illustrating steps in a method for augmenting incomplete objects in a base VR model with surface segments and filling in missing objects in the base VR model with filler objects, in accordance with one embodiment of the present disclosure.

With the detailed description of the various modules of system 200 including the augmented base VR model builder 200 and deep learning engine 190, flow diagram 400B of FIG. 4B discloses a method for building VR gaming environments using real-world VR models as a base from third party mapping systems including augmenting incomplete objects in a base VR model with surface segments and filling in gap regions in the base VR model with filler objects, in accordance with one embodiment of the present disclosure. Flow diagram 400B is implemented within system 200, and more particularly within the augmented base VR model builder 200 and/or deep learning engine 190, when building the augmented VR models of corresponding real-world environments, as previously described.

At 433, the method includes determining the plurality of real-world objects in the real-world environment. For example, images and/or videos of the real-world environment may be analyzed by the deep learning engine 190 to not only recognize the locality (e.g., name, place, etc.), but also objects within the locality. The base VR model may provide at least some of the images and/or videos used for object determination. In addition, other data sources may be used for object determination, such as guidebooks, published information related to the locality, city promotional material, etc., wherein object identification algorithms may be implemented (e.g., text parser) may be implemented to determine which objects are found in the locality.

In addition, an analysis of the base VR model may help determine which real-world objects from the plurality of real world objects are represented in the base VR model. The base VR model may include representations of objects found in the corresponding real-world environment, as determined by images and/or videos used by the third party mapping entity when building the base VR model. Typically, the number of images and/or videos used to build the base model is insufficient to build a complete VR model, such that not all views of the real-world environment are presented within the base VR model. Missing objects and gap regions in the base VR model can be determined partly through understanding which objects are represented in the base VR model, as described below.

At 435, the method includes detecting a plurality of surface models for the plurality of real-world objects in the base VR model. The surface models are generated as 3D models, suitable for viewing from any angle or perspective. The 3D models may be a collection of points (e.g., vertices) in space that are connected by various geometries (e.g., triangles, lines, etc.). The surfaces may also be textured. Depending on the third party mapping entity, the base VR model includes objects that may be configured as polygon mesh, curved modeling for curved surfaces, point models, wireframes, etc.

At 437, the method includes detecting incomplete surface models in the plurality of surface models. Incomplete objects and/or models are shown in FIG. 5B. Because the number of images and/or videos used to build the base VR model is insufficient, not all views of all objects can be generated. For example, if only one image of an object is captured and used to create and/or build the corresponding object model, then that one image can only capture one side of the object. As such, the object model is incomplete as there is no imaging of the opposing side. That is, the opposing side in the object model is blank. Embodiments of the present disclosure are able to complete the surface model for use when modifying the base VR model, as described below.

At 439, the method includes augmenting the surfaces of the incomplete surface models to generate augmented surface models. In that manner, complete surface models for the corresponding objects can be placed into the base VR model so that those objects can be fully viewed from all angles. In one embodiment, a first object is recognized as being associated with a first surface model in the base VR model. The first surface model was previously identified as being incomplete, such that not all views of the first object is available in the base VR model. The first object may be recognized using an object recognition algorithm/model for that particular object type. The base VR model includes a plurality of surface models, each of which corresponds to a real-world object.

In one embodiment, after the first object is recognized as being associated with a first incomplete surface model, then a plurality of images and/or videos of the first object are obtained from a second data storage (e.g., from a third party image collecting entity). The supplementary images and/or videos are not obtained necessarily from the original third party mapping entity, as it is presumed that the images and/or videos used to create the base VR model is still insufficient to build a complete surface model—unless the third party mapping entity has other images and/or videos that were not used when building the base VR model, and can be used for completing the object models. As such, the supplementary images and/or videos are obtained, such as from another third party mapping entity, or image collection entity, localized object data store, etc. These supplementary images and/or videos are then used to augment the first incomplete surface model with surface segments that are generated based on the plurality of images of the first object to generate a first augmented surface model for the first object. For instance, various stitching techniques can be used to stitch together the supplementary images and/or videos that can be used to complete the surface model for the first object. In that manner, the incomplete first surface model is augmented with at least one surface segment that is built from the plurality of images and/or videos to generate an augmented first surface model. This augmented first surface model may be used to stitch the first object with other objects in the base VR model.

In another embodiment, after the first object is recognized as being associated with a first incomplete surface model, then a previously generated and complete first surface model can be accessed at 441, for example from an object data store (e.g., from a third party image collecting entity, from the third party mapping entity, from a localized data store, etc.). This complete first surface model can be used as a substitute for the corresponding incomplete surface model to represent the first surface model when stitching the first object with other objects in the base VR model. That is, when generating an augmented VR world of the real-world environment, the first incomplete surface model is substituted by the previously generated complete first surface model.

In still another embodiment, after the first object is recognized as being associated with a first incomplete surface model, then a complete first surface model can be generated. For example, a plurality of images and/or videos of the first object from a second data storage (e.g., from a third party image collecting entity) may be accessed, as previously described. A complete first surface model of the first real-world object may be generated using the plurality of images and/or videos. This complete first surface model can be used as a substitute for the corresponding incomplete surface model to represent the first surface model when stitching the first object with other objects in the base VR model. That is, when generating an augmented VR world of the real-world environment, the first incomplete surface model is substituted by the newly generated complete first surface model.

In addition, objects that are known to be present in the real-world environment but not represented in the base VR model can be identified. Missing objects are shown in FIG. 5B. For example, in a street scene, a building at a particular location on the street is identified to be within the environment. An analysis of the base VR model may determine that a representation of the building is not represented in the base VR model. As such, embodiments of the present disclosure are able to access and/or build a surface model of the missing object for use when modifying the base VR model. A previously generated surface model or a newly generated surface model of the missing object may be used to represent the missing object when modifying the base VR model. That is, when generating an augmented VR world of the real-world environment, the previously generated surface model or a newly generated surface model of the missing object is used when stitching the missing object with other objects in the base VR model.

At 443, the method includes detecting gap regions in the first plurality of real-world objects in the base VR model. Gap regions are described and shown in FIG. 5B. Because the number of images and/or videos used to build the base VR model is insufficient, not all views of the real-world environment can be supported in the base VR model. That is, gap regions exist in the base VR model, wherein a gap region may include one or more missing objects. In one embodiment, the gap regions are determined by first recognizing the real-world environment that corresponds to the base VR model. This recognition may be performed using a deep learning engine, as previously described. For example, the raw images and/or videos used to generate the base VR model, or the base VR model itself or images from the base VR model, may be provided as input to the deep learning engine. Based on similar patterns or characteristics, the deep learning engine can recognize that the input data is similar to previously learned data associated with the corresponding real-world environment. As such, the real-world environment may be recognized and/or labeled. Further, once the real-world environment is recognized, expected regions and/or objects in the real-world environment can be determined. Also, regions and/or objects that are missing in the base VR model indicate one or more gap regions in the base VR model. For example, real-world objects as represented in the base VR model may be compared with known objects existing in the real-world environment.

At 445, the method includes accessing and/or generating one or more filler surface models for filler objects to be located in the gap regions. A filler object may or may not correspond to objects in the real-world environment, as described below.

In one embodiment, the filler object may not relate to any object present in the real-world environment. A previously generated first filler surface model that is complete is accessed. In this case, the previously generated complete first filler surface model is placed into the first gap location of the base VR model when generating the augmented VR world of the real-world environment. The previously generated first filler surface model may be used to fill in the gap region when modifying the base VR model. That is, when generating an augmented VR world of the real-world environment, the previously generated first filler surface model is used when stitching the filler object with other objects in the base VR model In another embodiment, the filler object may relate to an object that is present in the real-world environment, but is missing in the base VR model. For example, a first gap object may be detected, wherein the first gap object is known to exist in the real-world environment, but is missing in the base VR model. The first gap object is associated with a gap region (e.g., first gap location) in the base VR model. The first filler surface model may be newly generated by accessing a plurality of images of the first gap object from a second data storage, as previously described. For instance, the second data storage may be associated with a third party image collecting entity, or may be a proprietary data storage including images for a plurality of objects. In this case, the first filler surface model for the first gap object is generated based on the plurality of images. As such, the first filler surface model is placed into the first gap location of the base VR model when generating the augmented VR world of the real-world environment. That is, the first filler surface model of the first gap object may be used to represent the first gap object when modifying the base VR model. In particular, when generating an augmented VR world of the real-world environment, the first filler surface model is used when stitching the first gap object with other objects in the base VR model.

At 447, the method includes stitching in the augmented surface models and the one or more filler surface models into the base VR model to generate an augmented VR model corresponding to the real-world environment. For example, stitching includes substituting the augmented surface models for the incomplete surface models when generating the augmented VR model. In addition, the one or more filler surface models are placed into the base VR model of the real-world environment when generating the augmented VR model. As such, within the augmented VR model, objects are viewable from any location. That is, the augmented VR model of the real-world environment is complete, such that views can be generated from any location in the real-world environment. In that manner, objects can be viewable from any perspective as taken from any location in the environment of the augmented VR model.

In one embodiment, the real-world environment may be any localized environment, such as a city, a park, an inside setting, an outside setting, etc. For example, the real-world environment may be a museum, amusement park, cinema, city, room, house, apartment, etc. In another embodiment, the real-world environment is a recorded event, such as a recording of a live event (e.g., concert, movie, lecture, etc.). As such, a gaming application incorporating the augmented base VR world may be set in any real-world environment, as described above. One use case includes a gaming application that is a tour of a real-world environment that is a museum. As such, the user is able to maneuver (e.g., walk) through the museum to view objects on display in the museum in a virtual setting. In another use case, a gaming application may present a live event. As such, the user is able to walk around the venue holding the live event, and participate in the previously recorded, live event.

Figure 5A:
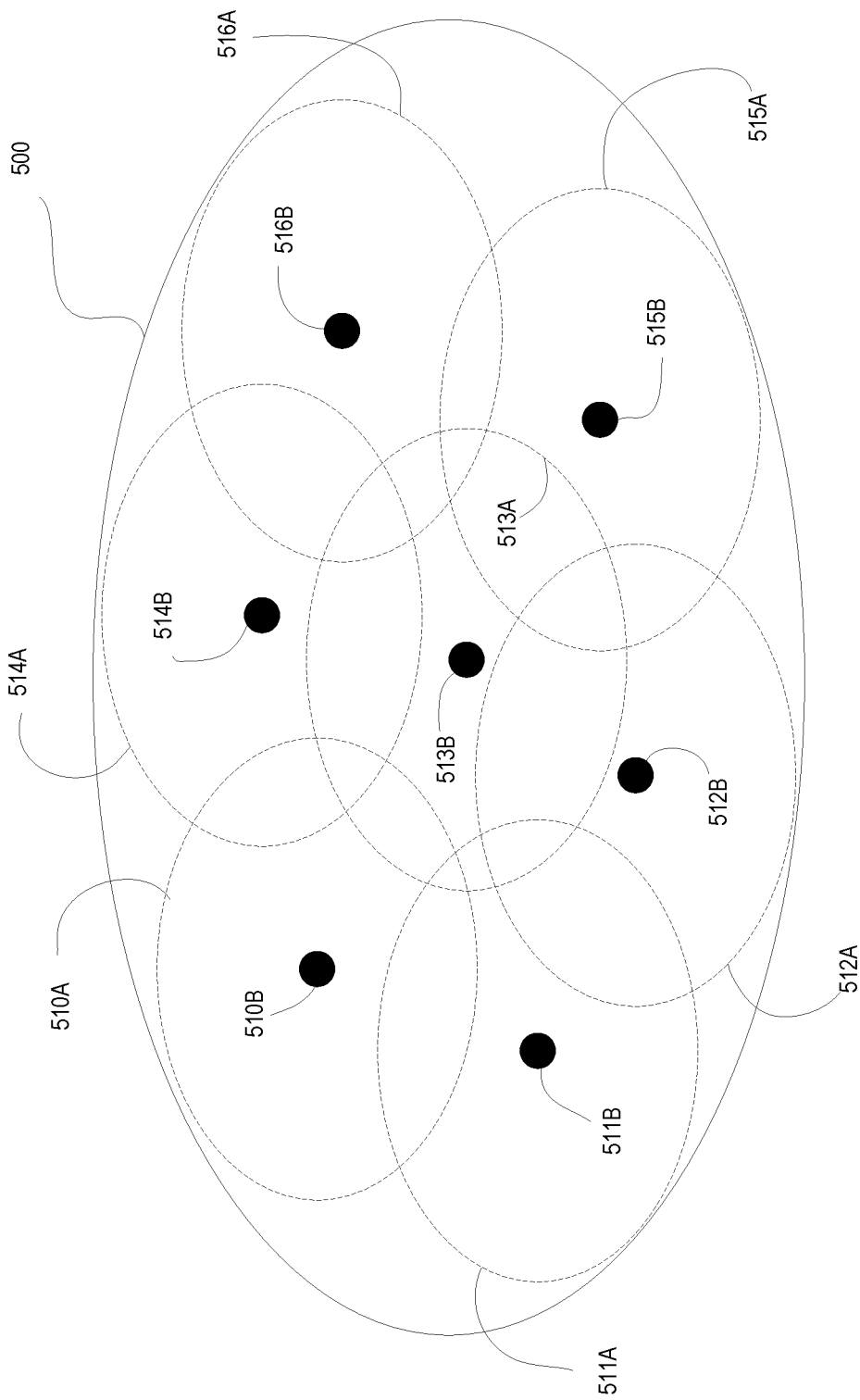
FIG. 5A illustrates the use of image capturing devices for building a base VR model of a real-world environment, in accordance with one embodiment of the disclosure.
Figure 5B:
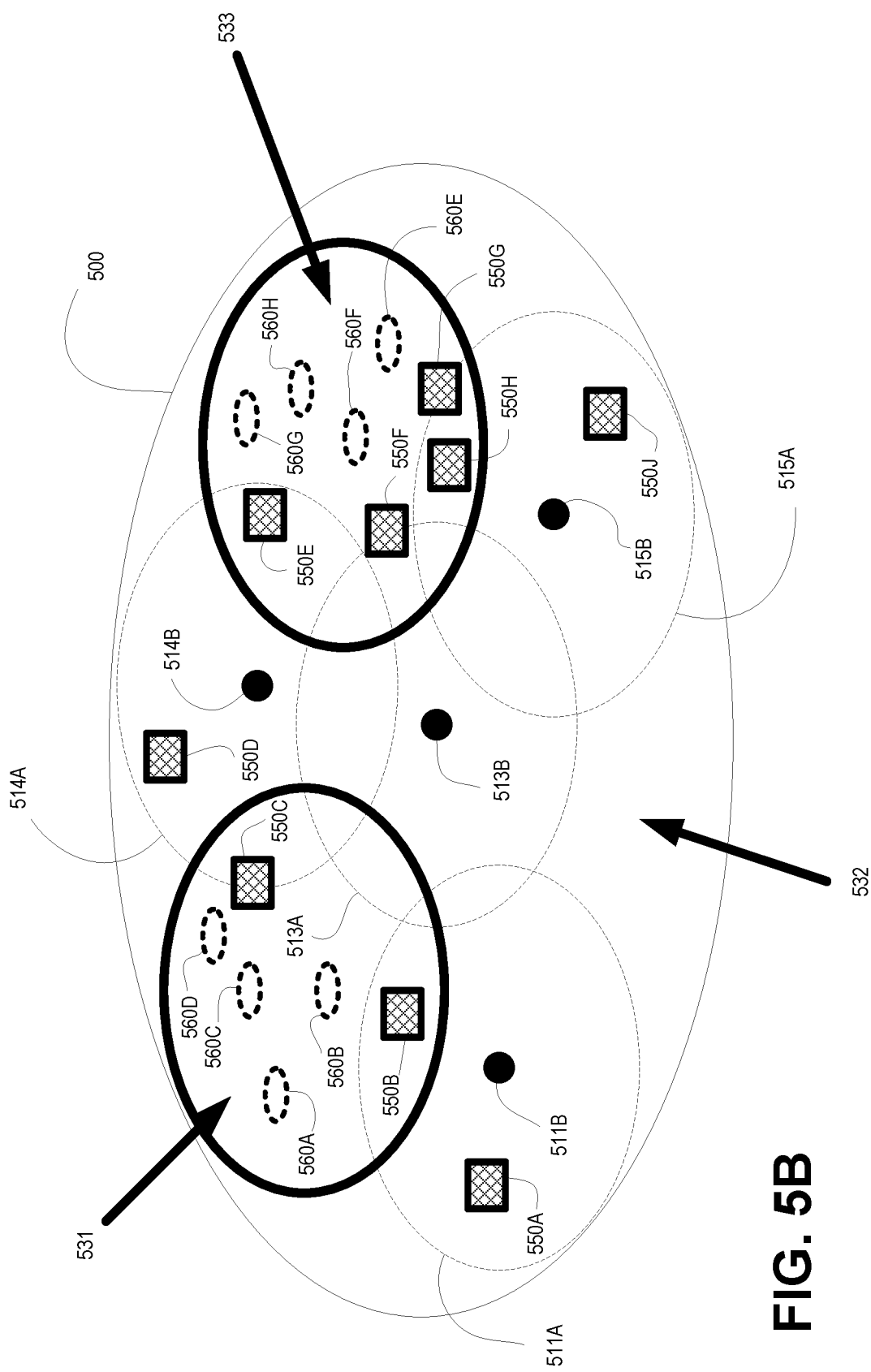
FIG. 5B illustrates the identification of incomplete objects and gaps within a VR model of a real-world environment when an insufficient number of image capturing devices are used for building a VR model, in accordance with one embodiment of the present disclosure.

FIG. 5A illustrates the use of image capturing devices for building a base VR model of a real-world environment 500, and includes the locations of video and audio data collection devices, in accordance with one embodiment of the present disclosure. For example, a plurality of data collection devices is located within the real-world environment 500. For example, the data collection devices may be located at points 510B, 511B, 512B, 513B, 515B, and 516B. The data collection devices may include an image and/or video capture device, and audio collection devices. Other types of data collection devices (e.g., temperature, audio, etc.) may also be used to create a fully immersive experience of the real-world environment. The images and/or videos recorded from the data capture devices may be used to generate virtual views of the real-world environment 500. In particular, the images and/or videos recorded may be stitched together to generate a base VR world/model, as previously described. This may include recordings of live events, wherein virtual views of the live event may be stitched together from video recordings taken from one or more data collection devices.

Ideally, enough data collection devices are used and interspersed to give full coverage of the real-world environment 500, as represented in the base VR model. As shown in FIG. 5A, each of the data collection devices at points 510B, 511B, 512B, 513B, 515B, and 516B have a coverage area. For example, data collection device at point 510A takes images and/or videos throughout coverage area 510A. Coverage area 511A shows the coverage from data collection devices at point 511B. Correspondingly, additional coverage areas 512A, 513A, 514A, 515A, and 516A are shown. Taken as a whole, the data collection devices provide full coverage of the real-world environment 500.

FIG. 5B illustrates the identification of incomplete objects and gaps within a base VR model of a real-world environment 500, when an insufficient number of image capturing devices are used for building a VR model, in accordance with one embodiment of the present disclosure. As shown in FIG. 5B, not enough data collection devices are used to collect data (e.g., images, videos, audio, etc.) from the real world environment. When compared to FIG. 5A, data collection devices at points 510B, 512B, and 516B are not provided. That is, there is no data collected in corresponding coverage areas 510A, 512a, and 516A, as shown from FIG. 5A.

Gap regions in the base VR model may be associated with the lack of data collection devices at points 510B, 512B, and 516B. For example, gap region 531 may be associated with the lack of a data collection device at point 510B. Gap region 531 includes objects 560A-560D that are missing from the base VR model, as not data was collected for those objects. Also, gap region 532 may be devoid of objects. Further, gap region 533 includes objects 560E-560F that are missing from the base VR model, as not data was collected for those objects.

In addition, other objects of the real-world environment 500 may be incomplete as represented in the base VR model because of a lack of multiple viewpoints captured for that object. For example, object 550A may only be captured from one data collection device at point 511B. In that case, a model of the object 550A may only have a front side of the object without any representation of the back side of the object. In addition, incomplete object 550B has coverage of one side from one viewpoint at 511B; incomplete object 550C has coverage from one side from one viewpoint at 514B; incomplete object 550D has coverage from one side from one viewpoint at 514B; incomplete object 550E has coverage from one side from one viewpoint at 514B; incomplete object 550F has coverage from one side from one viewpoint at 513B; and incomplete objects 550G, 550H, and 550J each has coverage from one side from one viewpoint at 515B.

Figure 6A:
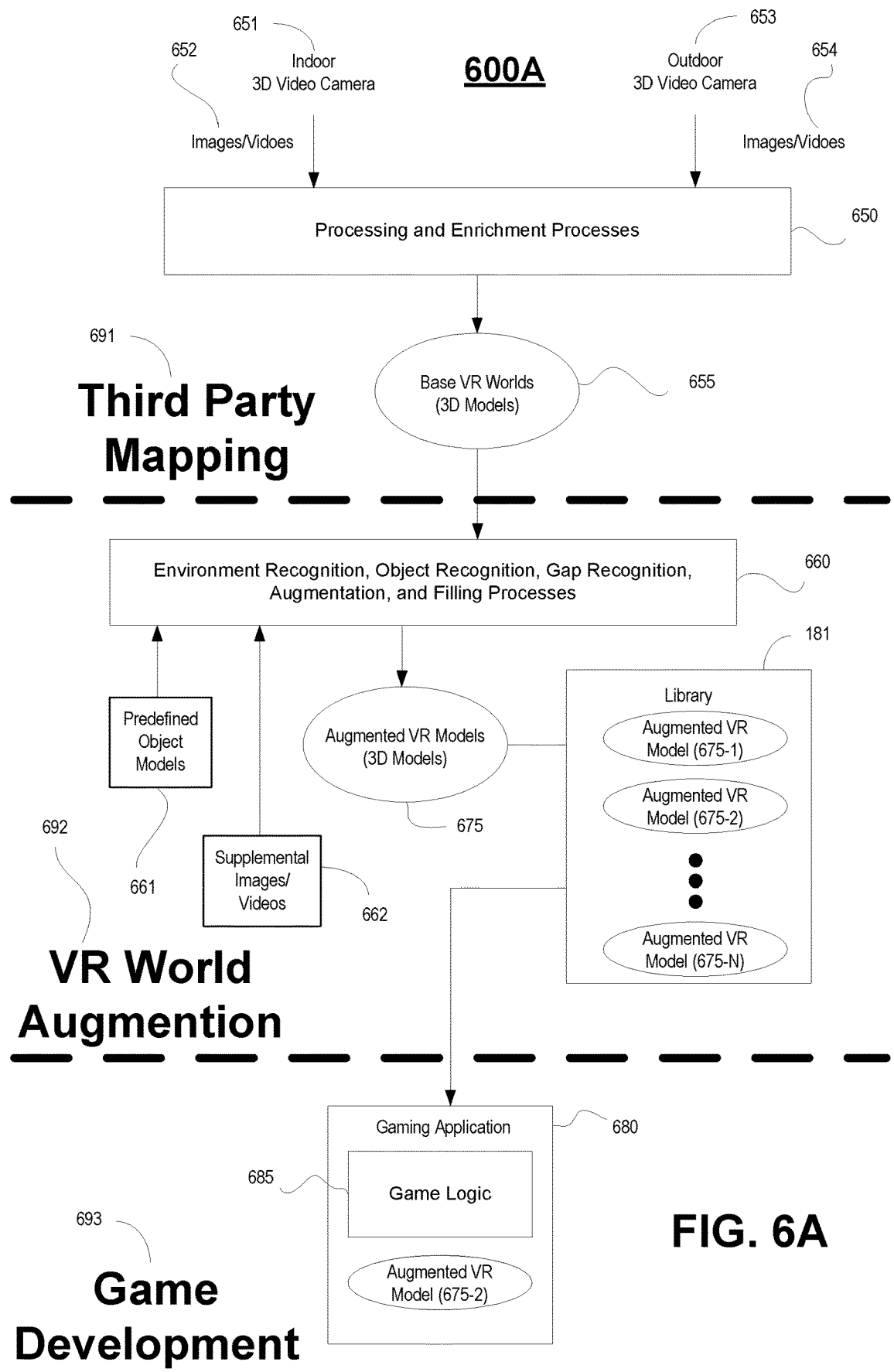
FIG. 6A is a data flow diagram illustrating the flow of information used for building VR gaming environments using real-world VR models as a base from third party mapping systems, in accordance with one embodiment of the present disclosure.

FIG. 6A is a data flow 600A illustrating the flow of information used for building VR gaming environments using real-world VR models as a base from third party mapping systems, in accordance with one embodiment of the present disclosure. The data flow 600A may follow flow diagrams 400A-400B of FIGS. 4A-4B, in one embodiment.

As shown, data flow 600A can be partitioned between three stages to include the third party mapping stage 691 as performed by a third party mapping entity, the VR world augmentation stage 692 for building the augmented VR worlds, and the usage stage 693. The usage stage may include game development to use the augmented VR worlds as gaming environments, and game play wherein a gaming application may be executing to provide a gaming environment based on the augmented VR world.

At the third party mapping stage 691, the third party mapping entity builds base VR models 655 of corresponding real-world environments. Typically, the third party mapping entity may make the base VR models 655 accessible to users for their use and enjoyment during game play. For example, a mapping company may provide mapping services to users (e.g., through a search engine) that may include a 3D view of one or more environments. As previously introduced, these base VR models are limited in coverage, as they provide only specific views into the digitally generated 3D world—and not from every location in that digitally generated 3D world.

In particular, base VR models 655 can be created for indoor environments and outdoor environments. The process and enrichment phase 650 used for generating the corresponding base VR model is similar for both the indoor and outdoor environments. For the indoor environment, one or more capture points in the physical, real-world environment are used, wherein one or more 3D video cameras 651 at the capture points are configured to capture images and/or videos 652 of the real-world environment. Audio and other data may also be captured of the real-world environment. Similarly, for the outdoor environment, one or more capture points in the physical, real-world environment are used, wherein one or more 3D video cameras 653 at the capture points are configured to capture images and/or videos 654 of the real-world environment. Audio and other data may also be captured of the real-world environment. The captured images and/or videos may be stitched together to form the base VR model/world 655.

At the VR world augmentation stage 691, augmented base VR models 675 of corresponding real-world environments are generated using the base VR models 655. For example, processes performed at 660 include recognizing the environment, objects within that environment, incomplete models of objects in the base VR model, gap recognition, augmentation of objects in the base VR model, and gap filling of the base VR model, as previously described. In part, augmented VR models 675 are built using predefined object model 661 and/or supplemental images/videos 662. A library 181 stores the plurality of augmented VR models (e.g., models 675-1 through 675-N).

At the usage stage 693, augmented base VR models may be used during game development and during game play. In particular, the usage stage may include game development, wherein access to the augmented VR worlds 675 by game developers is provided to allow the game developer to interface and/or integrate the augmented VR worlds 675 with game logic of corresponding gaming applications as gaming environments. For example, an augmented base VR model may be accessed by a game developer to integrate and/or interface the augmented base VR model into or with game logic 685 of a gaming application 680 during game development.

Figure 6B:
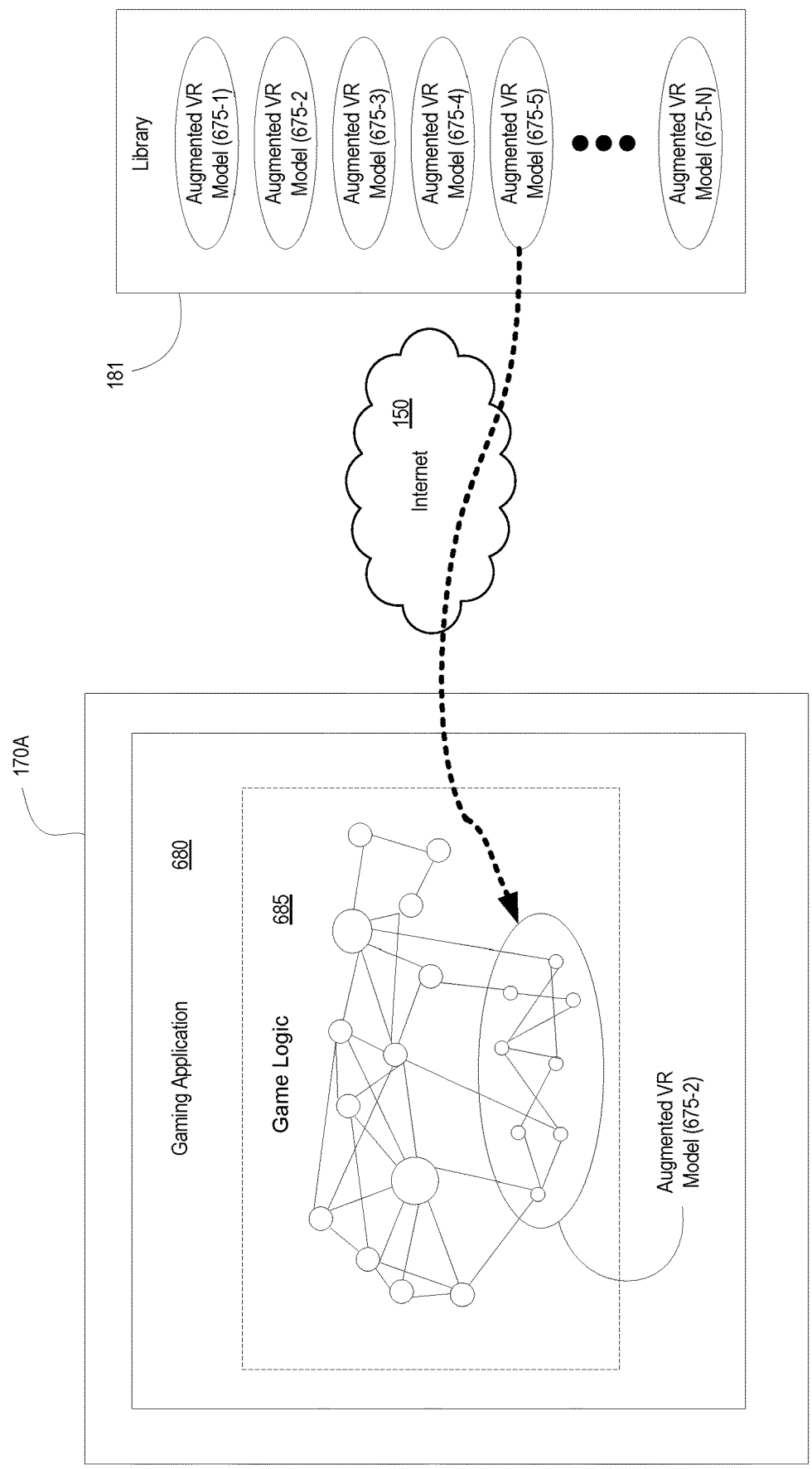
FIG. 6B illustrates the selection of an augmented VR model of a real-world environment, and the integration of the augmented VR model into a game logic of a gaming application, in accordance with one embodiment of the present disclosure.

In addition, the usage stage 693 may include game play, wherein game logic 685 executing (e.g., server, game console, etc.) in support of game play of a user interfaces with a corresponding augmented VR world to implement a gaming environment of the gaming application being played. For example, FIG. 6B illustrates the selection of an augmented VR model 675-5 of a real-world environment, and the integration of the augmented VR model 675-5 into a game logic 685 of a gaming application 680, in accordance with one embodiment of the present disclosure. As shown, game logic 685 of a gaming application 680 is executing in support of game play of a user. Game logic 685 may be represented by a plurality of nodes (e.g., execution nodes, logic nodes, data nodes, etc.), each of which is connected to one or more other nodes. The nodes of game logic 685 may also connect to nodes (e.g., execution nodes, logic nodes, data nodes, etc.) in the augmented VR model 675-2. In that manner, the game logic 685 interfaces with the selected augmented VR model 675-2. The gaming application 680 may be executing at a back-end server supporting a plurality of game plays of a plurality of gaming applications, or on a game console associated with the user.

In particular, the gaming application 680 may support one or more gaming environments. For example, the gaming application 680 may be a race car video game that is set on numerous race courses (real courses) that are found throughout the world. Each of the race courses may correspond to one of the plurality of augmented VR models 675 in library 181. During game play of a user, the user may have selected a particular race course corresponding to augmented base VR model 675-5. The augmented base VR model 675-5 is delivered over a network 150 to the client device 170A executing the gaming application 680 so that the gaming environment of the selected race course is provided to the game logic 685. In that manner, the user is able to race a car on the selected race course.

Figure 7:
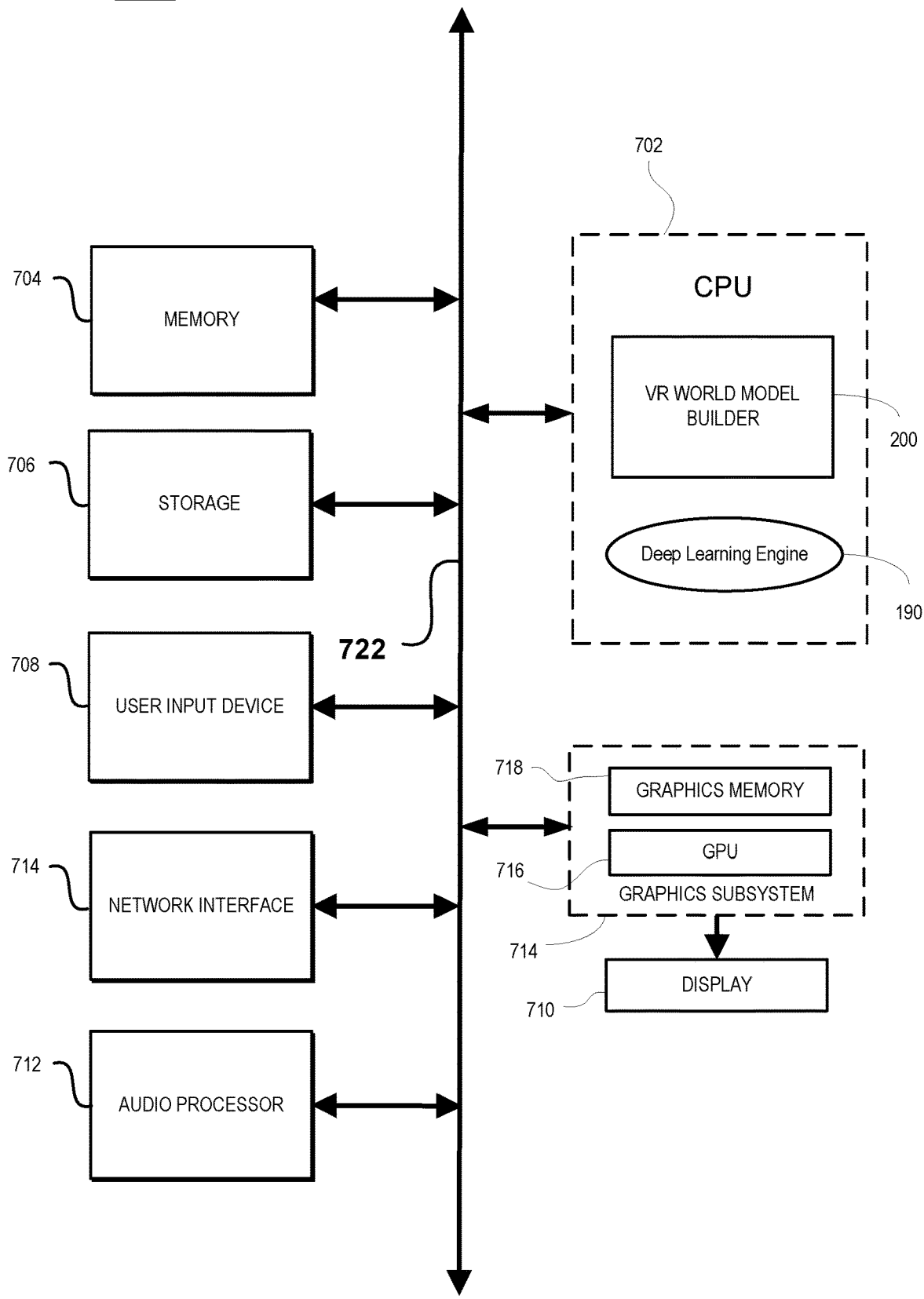
FIG. 7 illustrates components of an example device that can be used to perform aspects of the various embodiments of the present disclosure.

FIG. 7 illustrates components of an example device 700 that can be used to perform aspects of the various embodiments of the present disclosure. For example, FIG. 7 illustrates an exemplary hardware system suitable for implementing a device that provides services in support of a user, wherein the device may be configured for building augmented base VR worlds based on VR worlds provided by third party mapping entities, in accordance with one embodiment. This block diagram illustrates a device 700 that can incorporate or can be a personal computer, video game console, personal digital assistant, or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, or applications configured for building augmented base VR models, such as by VR world model builder 200, in cooperation with deep learning engine 190, as previously described.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722

A graphics subsystem 714 is further connected with data bus 722 and the components of the device 700. The graphics subsystem 714 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710, or to be projected by projection system 740. Display device 710 can be any device capable of displaying visual information in response to a signal from the device 700, including CRT, LCD, plasma, and OLED displays. Device 700 can provide the display device 710 with an analog or digital signal, for example.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data storage in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
   determining on a computing device that a surface model of an object in a base VR model of a real-world environment is incomplete, wherein the base VR model includes a plurality of surface models of a plurality of objects corresponding to real-world objects in the real-world environment;
   augmenting the object in the base VR model on the computing device, wherein the object corresponds to a real-world object in the real-world environment; and
   stitching in the object that is augmented into the base VR model on the computing device to generate an augmented base VR model configured for use as a gaming environment in a gaming application,
   wherein the augmented base VR model includes a replacement surface model for the object that is augmented.

2. The method of claim 1, wherein the augmenting the object includes:
   accessing a previously generated surface model corresponding to the real-world object,
   wherein the previously generated surface model is used as the replacement surface model for the object that is augmented when performing the stitching.

3. The method of claim 1, wherein the augmenting the object includes:
   accessing a plurality of images of the real-world object;
   generating a complete surface model of the object of the real-world object based on the plurality of images,
   wherein the complete surface model is used as the replacement surface model for the object that is augmented when performing the stitching.

4. The method of claim 1, wherein the augmenting the object includes:
   accessing a filler object having a filler surface model,
   wherein the filler surface model of the filler object is used as the replacement surface model for the object that is augmented when performing the stitching.

5. The method of claim 1, further comprising:
   detecting a missing portion of the surface model of the object that is incomplete,
   wherein the augmenting the object includes generating an augmented surface model of the object using a surface segment corresponding to the missing portion of the surface model; and
   wherein the stitching in the object includes generating the augmented base VR model by stitching the augmented surface model as the replacement surface model for the object into the base VR model.

6. The method of claim 1, further comprising:
   detecting the real-world object based on one or more images or videos of the real-world environment using a deep learning engine including a plurality of learned models of objects.

7. The method of claim 1, further comprising:
   detecting a plurality of real-world objects of the real-world environment based on one or more images or videos of the real-world environment;
   detecting a gap region in the base VR model including one or more missing surface models corresponding to one or more of the plurality of real-world objects;
   accessing a filler surface model of a filler object; and
   stitching in the filler surface model into the base VR model in the gap region to generate the augmented base VR model.

8. A method, comprising:
   determining on a computing device that a surface model of an object in a base VR model of a real-world environment is incomplete, wherein the base VR model includes a plurality of surface models of a plurality of objects corresponding to real-world objects in the real-world environment;
   generating at the computing device an augmented surface model of the object using a surface segment corresponding to a missing portion of the surface model, wherein the object corresponds to a real-world object in the real-world environment; and
   generating an augmented base VR model on the computing device by stitching the augmented surface model into the base VR model, such that the augmented base VR model includes the augmented surface model of the object, wherein the augmented base VR model is configured for use as a gaming environment in a gaming application.

9. The method of claim 8, further comprising:
accessing the base VR model of the real-world environment from a third party mapping data store.

10. The method of claim 8, wherein the generating an augmented surface model includes:
accessing a plurality of images of the real-world object;
building the surface segment from the plurality of images; and
augmenting the surface model using the surface segment to generate the augmented surface model.

11. The method of claim 8, further comprising:
detecting the real-world object based on one or more images or videos of the real-world environment using a deep learning engine including a plurality of learned models of objects.

12. The method of claim 8,
wherein the surface segment is a generic surface segment.

13. A non-transitory computer-readable medium storing a computer program, the computer-readable medium comprising:
program instructions for determining on a computing device that a surface model of an object corresponding to the real-world object in a base VR model of a real-world environment is incomplete, wherein the base VR model includes a plurality of surface models of a plurality of objects corresponding to real-world objects in the real-world environment;
program instructions for augmenting the object in the base VR model on the computing device, wherein the object corresponds to a real-world object in the real-world environment; and
program instructions for stitching in the object that is augmented into the base VR model on the computing device to generate an augmented base VR model configured for use as a gaming environment in a gaming application,
wherein the augmented base VR model includes a replacement surface model for the object that is augmented.

14. The non-transitory computer-readable medium of claim 13, wherein the program instructions for augmenting the object includes:
program instructions for accessing a previously generated surface model corresponding to the real-world object,
wherein the previously generated surface model is used as the replacement surface model for the object that is augmented when performing the stitching.

15. The non-transitory computer-readable medium of claim 13, wherein the program instructions for augmenting the object includes:
program instructions for accessing a plurality of images of the real-world object;
program instructions for generating a complete surface model of the object of the real-world object based on the plurality of images,
wherein the complete surface model is used as the replacement surface model for the object that is augmented when performing the stitching.

16. The non-transitory computer-readable medium of claim 13, wherein the program instructions for augmenting the object includes:
program instructions for accessing a filler object having a filler surface model,
wherein the filler surface model of the filler object is used as the replacement surface model for the object that is augmented when performing the stitching.

17. The non-transitory computer-readable medium of claim 13, further comprising:
program instructions for detecting a missing portion of the surface model of the object that is incomplete,
wherein the augmenting the object includes generating an augmented surface model of the object using a surface segment corresponding to the missing portion of the surface model; and
wherein the stitching in the object includes generating the augmented base VR model by stitching the augmented surface model as the replacement surface model for the object into the base VR model.

18. The non-transitory computer-readable medium of claim 13, further comprising:
program instructions for detecting the real-world object based on one or more images or videos of the real-world environment using a deep learning engine including a plurality of learned models of objects.

19. The non-transitory computer-readable medium of claim 13, further comprising:
program instructions for detecting a plurality of real-world objects of the real-world environment based on one or more images or videos of the real-world environment;
program instructions for detecting a gap region in the base VR model including one or more missing surface models corresponding to one or more of the plurality of real-world objects;
program instructions for accessing a filler surface model of a filler object; and
program instructions for stitching in the filler surface model into the base VR model in the gap region to generate the augmented base VR model.

* * * * *